United States Patent
Stählin

(10) Patent No.: US 12,019,171 B2
(45) Date of Patent: Jun. 25, 2024

(54) METHOD FOR DETERMINING THE POSITION OF A VEHICLE AS A FUNCTION OF THE VEHICLE VELOCITY

(71) Applicant: Continental Teves AG & Co. OHG, Frankfurt am Main (DE)

(72) Inventor: Ulrich Stählin, Eschborn (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 369 days.

(21) Appl. No.: 16/949,532

(22) Filed: Nov. 2, 2020

(65) Prior Publication Data

US 2021/0088673 A1    Mar. 25, 2021

Related U.S. Application Data

(63) Continuation of application No. PCT/EP2019/056753, filed on Mar. 19, 2019.

(30) Foreign Application Priority Data

May 3, 2019    (DE) ..................... 10 2018 206 828.3

(51) Int. Cl.
*G01S 19/41*        (2010.01)
*G01C 21/16*        (2006.01)
(Continued)

(52) U.S. Cl.
CPC ............ *G01S 19/41* (2013.01); *G01C 21/188* (2020.08); *G01S 19/426* (2013.01); *G01S 19/49* (2013.01); *G01S 19/52* (2013.01)

(58) Field of Classification Search
CPC ........ G01S 19/34; G01S 19/41; G01S 19/423; G01S 19/426; G01S 19/43; G01S 19/48;
(Continued)

(56) References Cited

U.S. PATENT DOCUMENTS

| 5,416,712 A | 5/1995 | Geier et al. |
| 5,771,456 A | 6/1998 | Pon |

(Continued)

FOREIGN PATENT DOCUMENTS

| CN | 201465309 | 5/2010 |
| CN | 101785039 A | 7/2010 |

(Continued)

OTHER PUBLICATIONS

E.D. Kaplan et al., Understanding GPS: Principles and Applications, Second Edition, Artech House, p. 54-55, 334, 459-488, 559 ( Year: 2006).*

(Continued)

*Primary Examiner* — Bernarr E Gregory
*Assistant Examiner* — Fred H Mull

(57) ABSTRACT

A method for determining the position of a vehicle is disclosed. GNSS signals from a global satellite navigation system are received by a receiving device. A vehicle velocity is detected; and a check is carried out as to whether the detected vehicle velocity falls below or exceeds a threshold value. After the vehicle velocity falls below the threshold value, the position of the vehicle is determined on the basis of a first calculation method. After the vehicle velocity exceeds the threshold value, the position of the vehicle is determined on the basis of a second calculation method. Both calculation methods include filtering the GNSS signals by a fusion algorithm. The calculation methods differing by input variables of the fusion algorithm.

6 Claims, 1 Drawing Sheet

(51) Int. Cl.
  *G01S 19/42* (2010.01)
  *G01S 19/49* (2010.01)
  *G01S 19/52* (2010.01)

(58) Field of Classification Search
  CPC ........ G01S 19/485; G01S 19/49; G01S 19/52; G01C 21/183; G01C 21/188
  See application file for complete search history.

(56) References Cited

U.S. PATENT DOCUMENTS

| | | | |
|---|---|---|---|
| 5,841,399 A * | 11/1998 | Yu | G01S 19/20 342/357.29 |
| 6,249,245 B1 * | 6/2001 | Watters | G01S 5/0027 342/357.44 |
| 7,117,087 B2 | 10/2006 | Jung et al. | |
| 7,299,128 B2 | 11/2007 | Funayose | |
| 8,825,397 B2 | 9/2014 | Kasargod et al. | |
| 9,360,560 B2 | 6/2016 | Dutta et al. | |
| 9,612,343 B1 | 4/2017 | Martin et al. | |
| 2004/0267840 A1 * | 12/2004 | Ono | G01S 19/40 708/200 |
| 2006/0022872 A1 * | 2/2006 | Zimmerman | G01S 19/44 342/464 |
| 2008/0262728 A1 | 10/2008 | Lokshin et al. | |
| 2008/0303713 A1 * | 12/2008 | Han | G01S 19/45 342/357.28 |
| 2009/0167603 A1 | 7/2009 | Muraguchi | |
| 2009/0278738 A1 * | 11/2009 | Gopinath | G01S 19/34 455/574 |
| 2011/0140956 A1 * | 6/2011 | Henry | G01S 19/34 342/450 |
| 2014/0267686 A1 * | 9/2014 | Morin | G01S 19/49 348/113 |
| 2014/0288825 A1 | 9/2014 | Czompo et al. | |
| 2016/0036519 A1 | 2/2016 | Loomis et al. | |
| 2017/0089722 A1 * | 3/2017 | Steinhardt | G01C 21/20 |
| 2017/0299728 A1 * | 10/2017 | Lie | G01S 19/426 |
| 2019/0196022 A1 * | 6/2019 | Rezaei | G01S 19/426 |

FOREIGN PATENT DOCUMENTS

| | | | | |
|---|---|---|---|---|
| CN | 105116431 A | * | 12/2015 | ............ G01S 19/47 |
| CN | 105190356 A | | 12/2015 | |
| CN | 106627673 A | | 5/2017 | |
| DE | 69700177 T2 | | 12/1999 | |
| EP | 1826584 A2 | | 8/2007 | |
| EP | 1862811 B1 | | 3/2012 | |
| EP | 2141507 B1 | | 9/2012 | |
| EP | 2527873 A1 | | 11/2012 | |
| EP | 2557436 A1 | | 2/2013 | |
| EP | 2363732 B1 | | 6/2015 | |
| EP | 3168647 A1 | | 5/2017 | |
| JP | 2004144693 A | * | 5/2004 | |
| WO | 9612973 A1 | | 5/1996 | |
| WO | 02099453 A2 | | 12/2002 | |
| WO | 2004034080 A1 | | 4/2004 | |
| WO | 2011098333 A1 | | 8/2011 | |

OTHER PUBLICATIONS

Threshold. (2010). In S. M. H. Collin (Ed.), Dictionary of computing (6th ed.). Bloomsbury. Credo Reference: https://search.credoreference.com/content/entry/acbcomp/threshold/0 (Year: 2010).*
M. Petovello, How does a GNSS receiver estimate velocity?, InsideGNSS, Mar./Apr. 2015, p. 38-41 (Year: 2015).*
German Search Report dated Feb. 19, 2019 for the counterpart German Patent Application No. 10 2018 206 828.3.
International Search Report and the Written Opinion of the International Searching Authority dated Jun. 27, 2019 for the counterpart PCT Application No. PCT/EP2019/056753.
Chinese Office Action dated Aug. 10, 2023 for the counterpart Chinese Patent Application No. 201980029239.2 and DeepL translation of same.
Office Action dated Apr. 27, 2024 from corresponding Chinese patent application No. 201980029239.2.

* cited by examiner

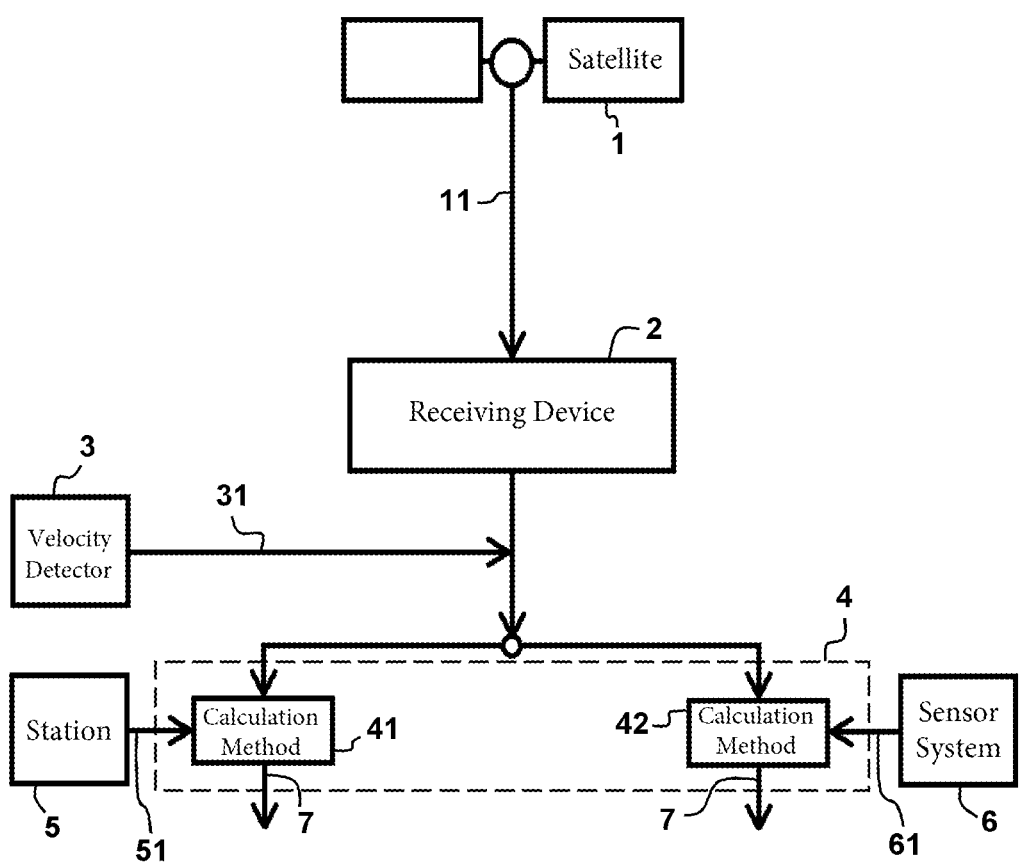

METHOD FOR DETERMINING THE POSITION OF A VEHICLE AS A FUNCTION OF THE VEHICLE VELOCITY

CROSS-REFERENCE TO RELATED APPLICATIONS

This application claims the benefit of International Application PCT/EP2019/056753, filed Mar. 19, 2019, which claims priority to German Application DE 10 2018 206 828.3, filed May 3, 2018. The disclosures of the above applications are incorporated herein by reference.

TECHNICAL FIELD

The disclosure relates to a method for determining the position of a vehicle as well as a corresponding control apparatus.

BACKGROUND

Determining a position of a vehicle by GNSS signals from a global satellite navigation system (GNSS) is generally known. For example, three-dimensional Cartesian coordinates are established by the measurement of pseudoranges based on the code and phase data which are output by the satellites on at least two frequencies in the L band. In the case of the available signals, a differentiation is made between the code, which is modulated onto the carrier signal and contains information about the respective satellite, and the carrier signal itself or respectively the phasing thereof. Accordingly, a distinction is made between code and phase observations.

It is furthermore known that additional information, which is obtained by sensors, for example inertial sensors or environment sensors, should be enlisted in vehicles in order to improve the determination of the position of a vehicle. It is, for example, known from WO 2011/098333 A1 that various sensor variables should be enlisted in a vehicle in order to improve already existing sensor variables or to generate new sensor variables and, consequently, to increase the detectable information.

During the position determination by the global satellite navigation system, it is possible to merely use the code observations in order to calculate coordinates. These have a significantly poorer accuracy, compared with phase observation, but are unambiguous. Phase measurements, on the other hand, are more accurate but ambiguous.

Accuracies at the level of centimeters can even be achieved with the aid of special methods, models and corrections. Whilst the determination of the absolute position in the conventional sense merely utilizes the code observations, a more accurate method, the Precise Point Positioning (PPP) method, is substantially based on the processing of the more accurate phase data, whilst the more inaccurate code observations are principally only used for calculating the necessary approximate solution. In addition to the position coordinates and the receiver clock error, the ambiguities due to the phase observation are part of the unknown here as well. Satellite orbit and satellite clock deviations accordingly have a particularly onerous effect. A community of organizations and authorities, the International GNSS Service (IGS), operates reference stations around the world, the satellite observations of which are analyzed and made publicly available as parameters. Consequently, satellite orbit and satellite clock deviations can be accurately determined and can be utilized for the Precise Point Positioning method.

Coordinate accuracies in the centimeter range can also be generated without precise satellite orbit and clock corrections with a somewhat different measuring arrangement. To this end, reference stations within a specific radius of the receiver in the vehicle can be utilized with a Real Time Kinematic (RTK) method, or respectively a Differential Global Positioning System (DGPS) method. The coordinates of the earth-fixed reference station are known so that a highly accurate baseline vector between the reference station and the vehicle receiver can be determined. In contrast to the Precise Point Positioning method, in which the three components of the searched station coordinates are incorporated into the adjustment process as primary unknowns, and absolute coordinates are immediately produced, the highly accurate components of the baseline vector are merely determined here as primary unknowns. The coordinates of the absolute position are produced by adding the vector of the satellite to the reference station and the baseline vector. The simultaneous observations of the reference station and receiver are influenced more or less uniformly depending on their proximity to one another so that some of the deviations which occur during GNSS measurements, in particular due to influences of the ionospheric and tropospheric refraction and also orbit deviations, are minimized.

Modern systems for determining the position of a vehicle typically have a fusion algorithm which processes at least GNSS signal data received by the receiver and dynamic information of the vehicle as input variables. At any time, all of the available input data are used and weighted against one another by an elaborate algorithm. Such modern methods supply, in part, very good information regarding the absolute position of the vehicle but are susceptible to poor ambient conditions.

SUMMARY

Therefore, the disclosure provides a method which makes it possible to determine the position of a vehicle precisely and/or in an efficient manner in terms of outlay.

According to an aspect of the disclosure, in a method for determining the position of a vehicle, GNSS signals from a global satellite navigation system are received by a receiving device, and the vehicle velocity is also detected and a check is carried out as to whether the detected vehicle velocity falls below or exceeds a threshold value. After the vehicle velocity falls below the threshold value, the position of the vehicle is determined on the basis of a first calculation method, whereas after the vehicle velocity exceeds the threshold value, the position of the vehicle is determined on the basis of a second calculation method, where both calculation methods includes filtering the GNSS signals by a fusion algorithm, the calculation methods differing by the input variables of the fusion algorithm.

The consideration which forms the basis of the disclosure is that known high-quality methods are indeed susceptible to poor ambient conditions, but they supply very precise information when the vehicle is stopped or travelling at low velocity. By contrast, it is true that only a lower precision can be achieved, albeit reliably and robustly in difficult ambient conditions, with traditional methods. In some implementations, the then reduced precision can be at least partially compensated for by corresponding additional information from sensors of the vehicle. Accordingly, depending on the movement condition of the vehicle, different input variables could be utilized for the fusion algorithm.

The fusion algorithm implemented in the filter compares the information with the input variables, in order to minimize error influences. To this end, the filter or respectively the fusion algorithm can indeed be configured in any way; however, a Kalman filter achieves the object very effectively with a comparatively low computational resource requirement.

In some examples, the input variables of the fusion algorithm according to the first calculation method includes, in contrast to the input variables of the fusion algorithm according to the second calculation method, an absolute position of the vehicle deduced from the GNSS signals. The absolute position may be determined from the GNSS signals, for example, on the basis of one of the methods described in the introductory section. In the case of the second calculation method which is used above the threshold, the absolute position deduced with the aid of the GNSS signals is not, by contrast, used as an input variable of the fusion filter. Instead, a variable which supplies more accurate and more robust results in the case of this movement condition is used.

The term "absolute position" may be construed as a position relative to the Earth or respectively relative to an earth-fixed point in the space.

In some examples, the absolute position is determined on the basis of the GNSS signals and also on the basis of additional signals for specifying the GNSS signals, wherein the additional signals are received by a station external to the vehicle. For example, a high-quality method is used, which permits position determinations with less than a meter's deviation. The station external to the vehicle can, for example, be a reference station according to the Real Time Kinematic method described in the introduction. Alternatively, the additional signals originate, for example, from the International GNSS Service and contain satellite orbit and satellite clock deviations.

In some implementations, the additional signals include satellite orbit and clock data from the global satellite navigation system, where the first calculation method is configured as a Precise Point Positioning method, or the additional signals include correcting information regarding the signal propagation time of the GNSS signal, where the first calculation method is configured as a Real Time Kinematic or Differential Global Positioning method, in which correcting information originating from at least one earth-fixed reference station which is configured to receive GNSS signals is received.

In some implementations, the input variables of the fusion algorithm according to the second calculation method include a velocity of the vehicle deduced from the GNSS signals. This can be used in a significantly more accurate and robust manner than the absolute position, such as above the threshold value of the vehicle velocity.

The velocity may be deduced in a favorable manner by an alteration in the position over time and/or from a Doppler shift of the GNSS signals. The Doppler shift corresponds to a modification in the received carrier frequency compared with the output carrier frequency, which is created by the relative movement between the receiver and satellite and, consequently, the velocity can be inferred.

In some examples, dynamic information, such as rotation rates detected by an inertial measurement unit or respectively IMU, for example a swaying, pitching and/or yaw rate, and/or acceleration data, for example a longitudinal, transverse and/or vertical acceleration and/or odometry information of wheel speed sensors and/or steering wheel angle information and/or information of environment sensors, is enlisted according to the second calculation method in order to determine the position of the vehicle. The dynamic information likewise preferably finds its way into the fusion algorithm. This information is preferably not enlisted for the first calculation method so that this results in a more targeted deployment of the dynamic information, especially since the first calculation method should be sufficiently accurate even without the dynamic information.

It is expedient that if the vehicle velocity does not fall below the threshold value for a specific period of time, or if the expected error of the position determination according to the second calculation method becomes too large, the position of the vehicle is additionally determined on the basis of the first calculation method, in which the thus determined position is then weighted more strongly in the fusion algorithm than the position established according to the second calculation method.

The respective calculation method should itself be able to establish the quality of the position information. Accordingly, in some implementations, an integrity check of the position deduced from the GNSS signals is carried out, for example, by way of Receiver Autonomous Integrity Monitor.

It is additionally possible, on the basis of the thus established quality, to obtain an additional decision aid regarding whether the first or the second calculation method is to be utilized, or respectively the decision made on the basis of the threshold value of the vehicle velocity regarding a change in the calculation method can be confirmed or revoked.

Another aspect of the disclosure provides a control apparatus designed to carry out the method described above at least in accordance with one of the indicated embodiments.

The details of one or more implementations of the disclosure are set forth in the accompanying drawings and the description below. Other aspects, features, and advantages will be apparent from the description and drawings, and from the claims.

DESCRIPTION OF DRAWINGS

The FIGURE shows, in a schematic representation, an exemplary flow chart according to a method for determining a position of a vehicle.

Like reference symbols in the various drawings indicate like elements.

DETAILED DESCRIPTION

A GNSS signal 11 output by a satellite 1 of a global satellite navigation system transmits, on the one hand, the time of day and orbit data (ephemerides) of the satellite 1, on the other hand it allows, on the basis of the signal propagation time or respectively also the signal phase, the position of the receiving device to be established. The receiving device 2 in the form of a GNSS antenna is arranged in or on a vehicle, the position 7 of which is to ultimately be determined.

The position 7 of the vehicle is determined in that multiple input variables are supplied to a filter 4, such as, but not limited to a Kalman filter, which generates values that may be utilized with a fusion algorithm by weighting from the noisy input variables.

In addition, the vehicle has velocity detector 3 which calculates the vehicle velocity 31 based on wheel speeds with a known wheel diameter. However, any other type of velocity measurement may alternatively also be affected, for example including solely from the GNSS signals and/or IMU data. The detected vehicle velocity 31 serves as a decision-making basis for which calculation method 41, 42 is subsequently used in order to determine the position 7 of the vehicle. To this end, a specific threshold value of the vehicle velocity 31 is used. This can be set at a low vehicle velocity 31 which can, for example, also virtually assume the value zero.

The calculation methods 41, 42 are distinguished, first and foremost, by which variables are used as input variables for the fusion algorithm. As long as the vehicle velocity 31 falls below its threshold value, a first calculation method 41 is used, in which the position 7 is determined very precisely from the GNSS signals 11. This is possible, on the one hand, because the vehicle has a low vehicle velocity 31, on the other hand because additional signals 51 from a station 5 external to the vehicle are used. In this example, the station 5 is a stationary reference station of a DGPS system so that the propagation time differences of the GNSS signals 11 can be corrected with the aid of the additional signals 51. The precisely determined position data are supplied to the fusion algorithm as input variables. The fusion algorithm can, while the first calculation method 41 is selected, carry out an adaption of some internal condition variables in order to better be able to update these during a change in the calculation method 41, 42, without a settling time occurring.

In contrast thereto, if the threshold value of the vehicle velocity 31 is exceeded, a second calculation method 42 is used, in which the position is not determined by the GNSS signals 11, but the velocity of the vehicle is determined with a method which is more robust to external influences. To this end, the Doppler shift of the received GNSS signal 11, for example, can be used, which is a function of the vehicle velocity. The thus established velocity is supplied to the fusion algorithm as an input variable.

In order to make the position 7 of the vehicle determined by the fusion algorithm more precise in accordance with the second calculation method 42, dynamic information 61 is moreover supplied to the fusion algorithm by a sensor system 6 of the vehicle. The dynamic information 61 is obtained, for example, in the form of rotation rates and accelerations by an inertial measurement unit of the vehicle or in the form of odometry data by speed and steering angle sensors. Consequently, the fusion algorithm is not supplied with all of the available variables at any time, but specific variables are deliberately selected depending on the movement condition of the vehicle, and the fusion algorithm is adapted accordingly.

The first and the second calculation method 41, 42 may alternatively also be used simultaneously, wherein the more favorable method for the respective movement condition is, however, highlighted by means of an arithmetical weighting.

A number of implementations have been described. Nevertheless, it will be understood that various modifications may be made without departing from the spirit and scope of the disclosure. Accordingly, other implementations are within the scope of the following claims.

What is claimed is:

1. A method of determining a position of a vehicle, the method comprising:
   receiving, at the vehicle, global satellite navigation system (GNSS) signals from a global satellite navigation system;
   detecting, based on wheel speed of the vehicle, a first velocity of the vehicle;
   selecting, based on the first velocity of the vehicle, a calculation method from among a first calculation method of a fusion algorithm determining the position of the vehicle by processing first input variables comprising an absolute position of the vehicle deduced from the GNSS signals and a second calculation method of the fusion algorithm determining the position of the vehicle by processing second input variables comprising a second velocity of the vehicle deduced from the GNSS signals; and
   determining the position of the vehicle according to the calculation method,
   wherein the selecting comprises selecting both the first calculation method and the second calculation method as the calculation method if the vehicle velocity does not fall below a threshold value for a specific period of time, and
   wherein determining the position of the vehicle comprises determining the position of the vehicle is on the basis of the first calculation method, in which the position of the vehicle is weighted more strongly in the fusion algorithm than the position established according to the second calculation method.

2. The method according to claim 1, wherein the absolute position is determined on the basis of the GNSS signals and on the basis of additional signals for specifying the GNSS signals.

3. The method according to claim 2, wherein the additional signals comprise satellite orbit and clock data from the global satellite navigation system, and
   wherein the first calculation method is configured as:
      a Precise Point Positioning method and the additional signals comprise correcting information regarding the signal propagation time of the GNSS signal, or
      a Real Time Kinematic or Differential Global Positioning method, in which correcting information originating from at least one earth-fixed reference station which is configured to receive GNSS signals is received.

4. The method according to claim 3, wherein the second velocity is deduced by an alteration in the position over time and/or from a Doppler shift of the GNSS signals.

5. The method according to claim 4, wherein the second velocity is deduced from dynamic information, including rotation rates and/or acceleration data of an inertial measurement unit and/or odometry information of wheel speed sensors and/or steering wheel angle information and/or information of environment sensors.

6. The method according to claim 1, further comprising performing an integrity check of the position deduced from the GNSS signals by a Receiver Autonomous Integrity Monitor.

* * * * *